United States Patent [19]

Bunnell

[11] Patent Number: 5,361,464
[45] Date of Patent: Nov. 8, 1994

[54] DOUBLE ACTION SNAP HOOK

[75] Inventor: Edward Bunnell, Bristol, Conn.

[73] Assignee: Bourdon Forge Company, Inc., Middletown, Conn.

[21] Appl. No.: 49,997

[22] Filed: Apr. 20, 1993

[51] Int. Cl.$^5$ .............................................. A44B 13/00
[52] U.S. Cl. .................................. 24/599.5; 24/599.6; 24/600.1
[58] Field of Search ............... 24/599.5, 599.4, 599.6, 24/599.9, 600.1; 294/82.2, 82.21

[56] References Cited

U.S. PATENT DOCUMENTS

| | | |
|---|---|---|
| 590,933 | 9/1887 | Lueders . |
| 620,351 | 2/1889 | McMerrick . |
| 864,701 | 8/1907 | Shawver . |
| 1,071,650 | 8/1913 | O'Kelly . |
| 1,215,281 | 2/1917 | Jones . |
| 1,533,995 | 1/1924 | Lang . |
| 1,540,923 | 7/1925 | Blair . |
| 1,626,866 | 5/1927 | Neilson . |
| 1,667,957 | 5/1928 | Stevenson . |
| 1,849,816 | 3/1932 | Yingling . |
| 1,879,168 | 9/1932 | Freysinger . |
| 2,490,931 | 12/1949 | Thompson ................... 24/599.5 |
| 3,575,458 | 2/1969 | Crook . |
| 3,827,746 | 8/1974 | Byers . |
| 4,062,092 | 12/1977 | Tamada et al. . |
| 4,122,585 | 10/1978 | Sharp et al. . |
| 4,434,536 | 3/1984 | Schmidt et al. . |
| 4,528,728 | 7/1985 | Schmidt et al. . |
| 4,528,729 | 7/1985 | Schmidt et al. . |
| 4,539,732 | 9/1985 | Wolner . |
| 4,546,523 | 10/1985 | Bailey . |
| 4,977,647 | 12/1990 | Casebolt . |

Primary Examiner—Victor N. Sakran
Attorney, Agent, or Firm—Chilton, Alix & Van Kirk

[57] ABSTRACT

A double action closure mechanism operable with the thumb and forefinger of one hand, comprises a rigid body, such as a forged hook, having a first end, a second end forming a curved nose, and a shank extending between the ends, the shank defining a front side facing the nose, and a back side facing away from the nose. A closure frame is pivotally connected to the front side of the shank and defines a locking corner at the back side of the shank, a latching corner adjacent the nose of the rigid body, and an actuating corner at the front side of the shank, adjacent the pivotal connection. The latching corner includes a latching surface adapted to close against the nose when the frame is pivoted about the shank into a closed position, and to move away from the nose toward the shank when the frame is pivoted about the shank into an open position. A spring is connected between the front side of the shank and the frame, for urging the frame into a normally closed position. A locking member is supported within the locking corner of the frame and engagable with the back side of the shank when the frame is in the closed position, to prevent the frame from pivoting out of the closed position. An actuating member at the actuating corner is supported within the frame for movement toward the locking corner. This movement is effective to disengage the locking member from the back side of the shank, independently of the pivotal movement of the frame relative to the shank.

10 Claims, 4 Drawing Sheets

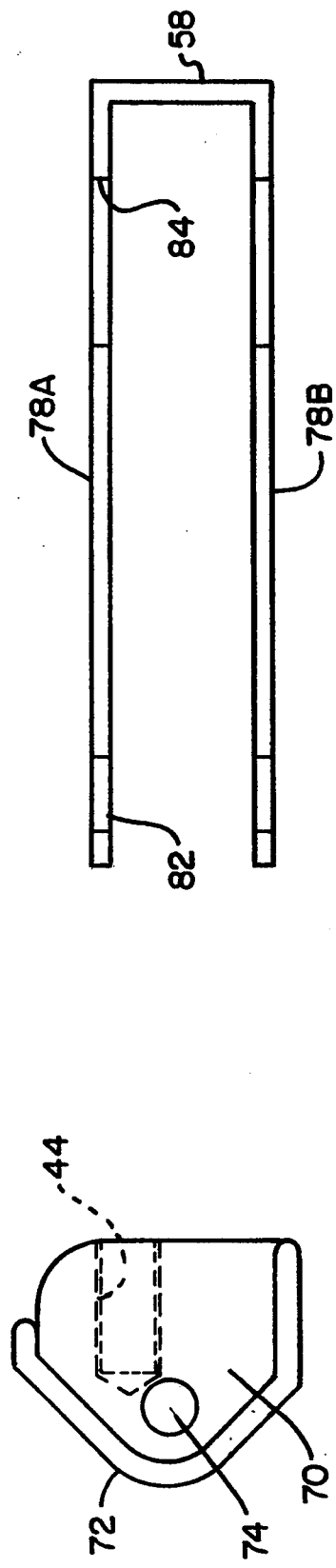
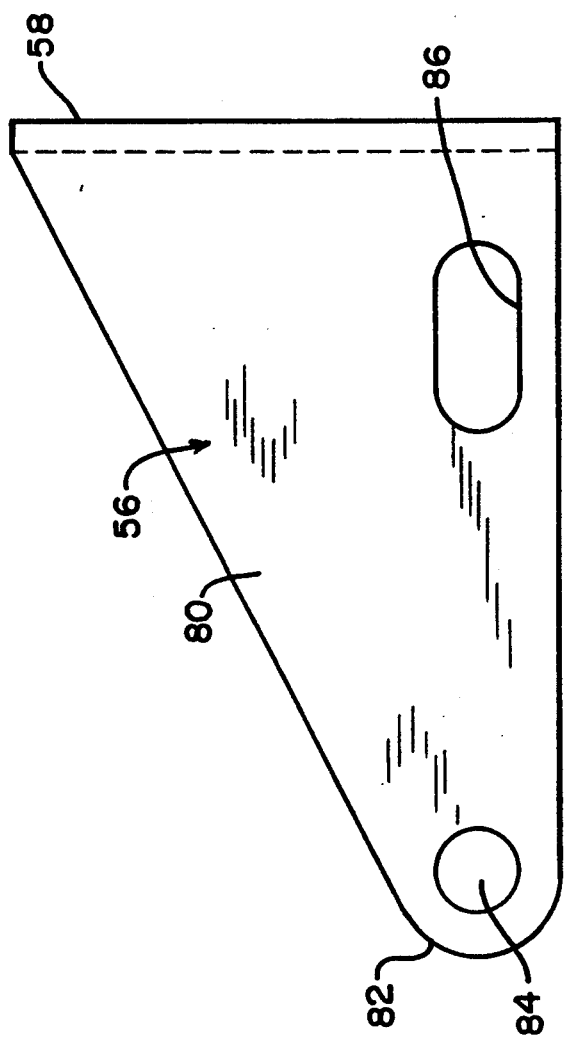

DOUBLE ACTION SNAP HOOK

BACKGROUND OF THE INVENTION

The present invention relates to closure mechanisms, such as snap hooks or the like, which are used in rigging, hoisting, and similar applications.

Snap hooks and the like have been employed for many years, but as safety concerns have grown, improvements have been made to assure that the hook or similar closure mechanism does not inadvertently open. Thus, various detents, complex actuators, interlocks and the like have been employed in connection with such closure mechanisms, but it has been difficult to arrive at a combination of safety, convenience, longevity and cost effectiveness.

SUMMARY OF THE INVENTION

It is, accordingly, an object of the present invention, to provide a double action closure mechanism, which is safe, robust, convenient to use in the field, and cost effective to manufacture.

It is a further object of the invention, that such closure mechanism be especially adaptable for use as a snap hook of the type developed for use in construction and other rigging environments, where the user may be wearing protective gloves and have only one hand readily available for opening the snap hook.

In accordance with the present invention, a double action closure mechanism operable with the thumb and forefinger of one hand, comprises a rigid body, such as a forged hook, having a first end, a second end forming a curved nose, and a shank extending between the ends, the shank defining a front side facing the nose, and a back side facing away from the nose. A closure frame is pivotally connected to the front side of the shank and defines a locking corner at the back side of the shank, a latching corner adjacent the nose of the rigid body, and an actuating corner at the front side of the shank, adjacent the pivotal connection. The latching corner includes a latching surface adapted to close against the nose when the frame is pivoted about the shank into a closed position, and to move away from the nose toward the shank when the frame is pivoted about the shank into an open position. A spring or similar biasing member is connected between the front side of the shank and the frame, for urging the frame into a normally closed position. Locking means are supported within the locking corner of the frame and engagable with the back side of the shank when the frame is in the closed position, to prevent the frame from pivoting out of the closed position. Actuating means at the actuating corner are supported within the frame for movement toward the locking corner. This movement is effective to disengage the locking means from the back side of the shank, independently of the pivotal movement of the frame relative to the shank.

In this manner, the closure mechanism can be grasped in one hand, with the thumb at the actuating corner and the forefinger at the locking corner of the frame. By first urging the actuating means toward the locking corner with the thumb to disengage the locking means from the shank, and then pulling the locking corner, like a trigger, toward the first end with the forefinger, the user pivots the frame from the closed to the open position.

With the present invention, only a single pivot connection is provided between the closure frame, which defines the latch, and the shank of the rigid body. To open the latch, the initial actuation occurs on the front side, whereas the locking and unlocking occur on the back side of the shank. An important aspect of the invention, is that the actuation to release the locking means is contained within the frame, but is operable independently of the frame. In particular, the actuation mechanism is displaced linearly to release the lock, whereas the frame is subsequently rotated to the open position.

The foregoing features permit the use of a relatively few, easily formed, robust components which do not require close fabrication and assembly tolerances, nor intricate manipulations for use in the field. Yet, the locking action is positive and secure, with the unlocking action being deliberate yet easily accomplished.

BRIEF DESCRIPTION OF THE DRAWINGS

These and other objects and advantages of the invention will be described below with reference to the accompanying drawings, in which:

FIG. 5 is a side view of the locking corner portion of the closure mechanism;

FIG. 6 is a side view of the actuating member which is contained within the closure frame shown in FIG. 1; and FIG. 7 is a top view of the actuating member shown in FIG. 6.

DESCRIPTION OF THE PREFERRED EMBODIMENT

The present invention is directed to a double action closure mechanism operable with the thumb and forefinger of one hand. For illustrative purposes, the preferred embodiment in the context of a double acting snap hook 10, will be described herein in connection with FIGS. 1–7.

Figure 1:
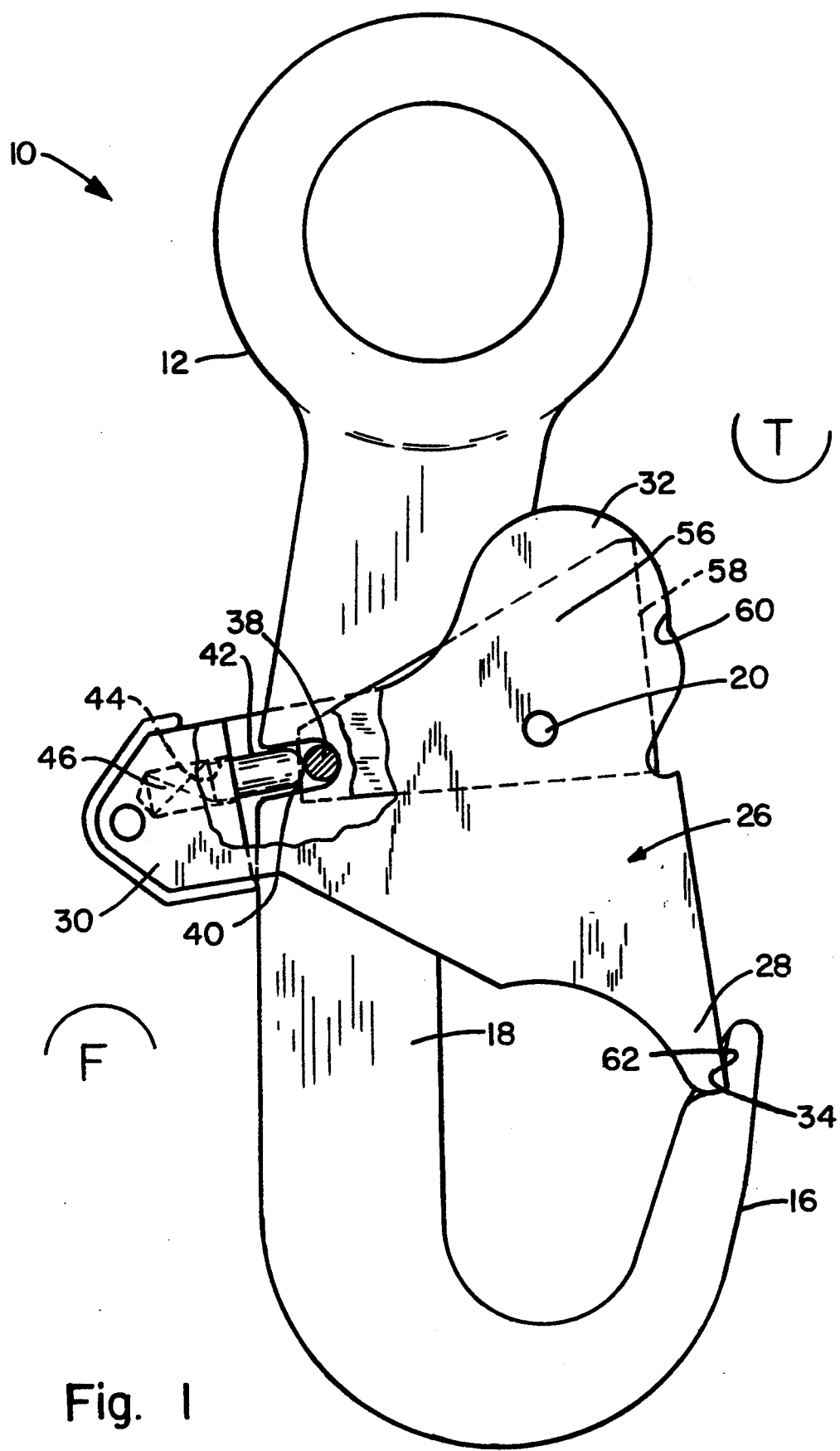
FIG. 1 is a front elevation view of the closure mechanism of the present invention, in a snap hook embodiment, showing the mechanism in a closed position.
Figure 2:
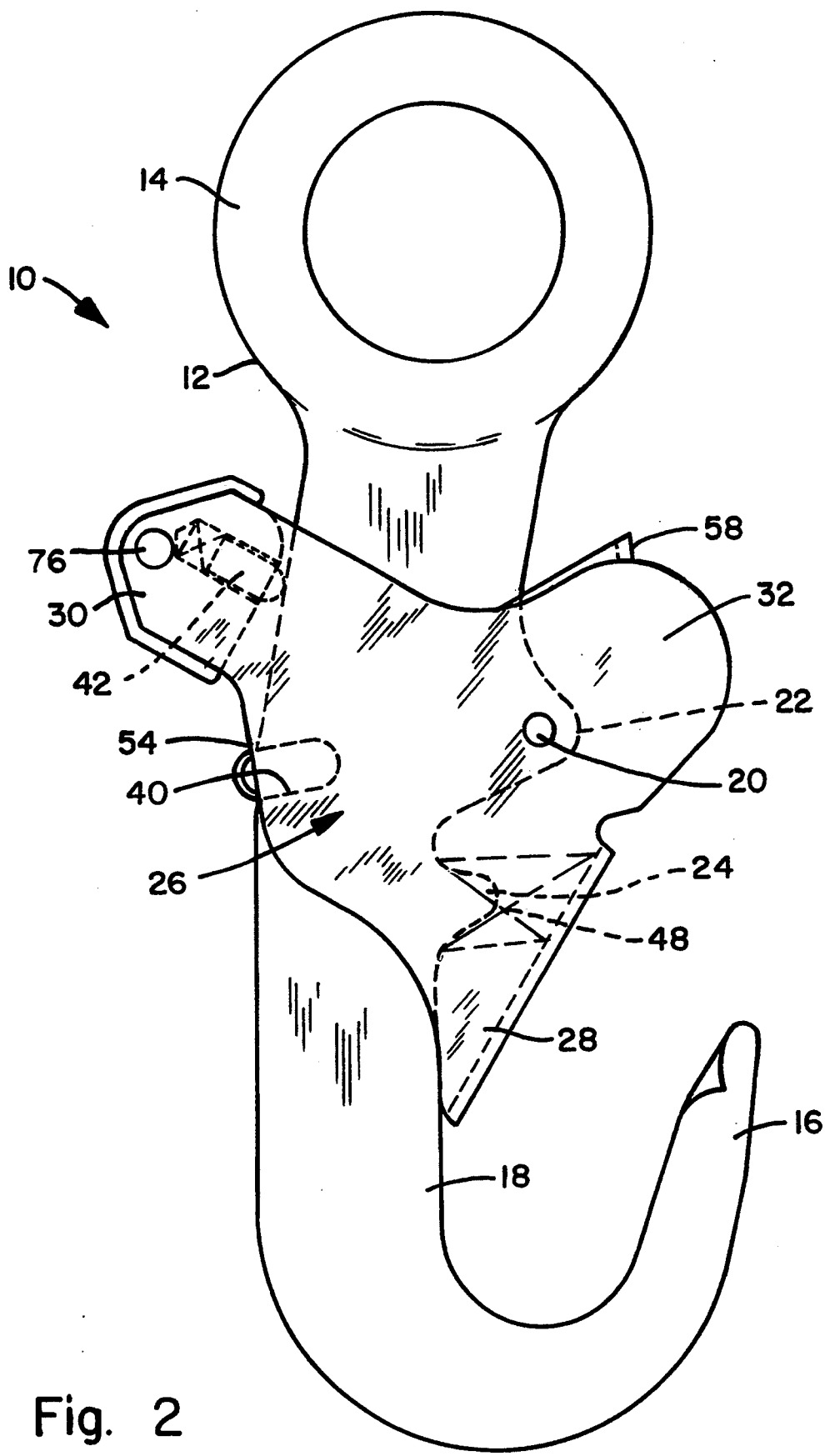
FIG. 2 is a view similar to FIG. 1, showing the closure mechanism in the open position.

FIGS. 1 and 2 show the overall construction and operation of the closure mechanism as a double action snap hook 10, with a hook body having a first end 12, preferably in the form of a ring 14 or the like adapted for attachment to a line or cable (not shown), a second end 16 forming a curved nose, and a shank 18 extending between the ends. The shank may be considered as having a front side facing the nose 16 and a backside facing away from the nose. A generally triangular closure frame 26, formed by a pair of substantially identical walls 27A, 27B, is situated transversely to the shank, such that a first or locking corner 30 is at the back side of the shank, a second or latching corner 28 is adjacent to the nose of the hook, and a third, actuating corner is at the front side of shank, between the nose 16 and the first end 12 of the hook. The closure frame 26 is pivotally connected to the shank at a single location 20, preferably at a first protrusion 22 from the front side of the shank, closer to the actuating corner 32 than to the locking corner 30.

The pivoting action about the pivot point 20 permits the latch corner 28 of the frame 26 to define a closed position (FIG. 1), whereby the latch corner latches against the nose at 34, and an open position (FIG. 2), whereby the latch corner has moved away from the nose 16 toward the shank 18.

Means are provided for maintaining the closure frame 26 in a nominal closed position, preferably by a coil spring or the like 48 which is piloted at one end by a second protrusion 24 from the front side of the shank 18, below the first protrusion 22, and bearing against the closure frame between the actuating corner 32 and the latch corner 28.

In the closed position shown in FIG. 1, locking means are effective between the locking corner 30 of the frame 26, and the back side of the shank 18, to prevent the frame from pivoting out of the closed position. The preferred form of these locking means is shown in phantom in FIG. 1. The locking means includes a locking pin 42 slidable into and out of a recess 40 on the back side of the shank 18. The locking pin 42 is slidingly supported within a bore, socket, or other formation 44 within the locking corner of the closure frame. A spring 46, or other means, biases the locking pin 42 into a locked position which is partly in the socket 44 and partly in the shank recess 40. With the locking pin in this position, it is impossible for the closure frame 26 to rotate about the pivot point 20. The length of the locking pin 42, and its relationship to the socket 44 and recess 40, is such that the pin may be urged against the spring 46 with sufficient "play" in the socket to withdraw the pin 42 substantially completely from the recess 40.

It can be appreciated from FIGS. 1 and 2 that withdrawal of the locking pin 42 from the recess 40, permits the latch corner 28 to be rotated away from the nose 16 upon the movement of the locking corner 30 toward the first end 12 of the body. During this movement, the locking pin 42 rides on the back side of the shank. To facilitate the transition of the locking pin 42 from its locked position within the recess 40, to the sliding movement of the pin 42 along the back side of the shank, the pin is preferably somewhat bullet-shaped, so as not to hang up at the edge 54 of the recess. Another important advantage of the bullet shape is that friction wear on the locking pin does not degrade the effectiveness of the locking action, because the head of the pin is always biased into the recess 40.

The dissengagement of the locking pin 42 from the back side of the shank is accomplished by actuating means that are accessible at the actuating corner 32 of the frame 26, and supported within the frame for movement toward the locking corner 30. This is preferably accomplished by a plunger 38 or the like located in the recess 40 on the backside of the shank, for slidable movement toward the locking pin 42, and a thumb piece 56 having a first end 58 accessible to the thumb through an opening 60 at the actuating corner 32 of the frame 26, such that by pushing the thumb piece 56 toward the locking corner 30, the plunger 38 pushes the locking pin 42 entirely out of the recess 40.

Thus, it can be appreciated from inspection of FIGS. 1 and 2, that the frame 26 can be pivoted about the shank 18 from the closed to the open position, by first urging the actuating means 56,38 toward the locking corner 30 with the thumb T, to dissengage the locking means 42 from the shank, and then pulling the locking corner 30 toward the shank first end with the forefinger F, in a trigger motion, to pivot the frame 26 from the position shown in FIG. 1, to the position shown in FIG. 2. Upon release of the forefinger F from the locking corner 30 when the frame 26 is in the open position shown in FIG. 2, the spring 48 on the front side of the shank snaps the frame 26 back to the closed position shown in FIG. 1.

Figure 3:
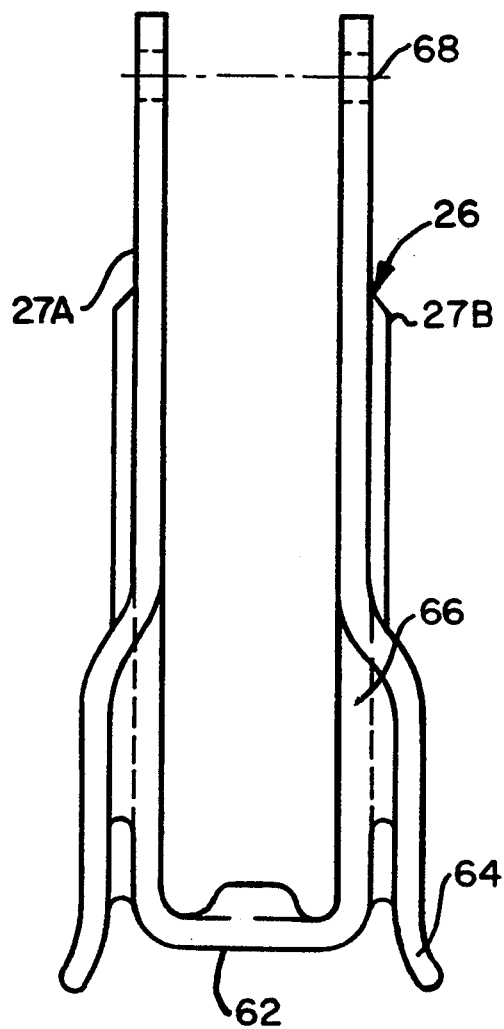
FIG. 3 is a top view of the closure frame of the closure mechanism shown in FIG. 1.
Figure 4:
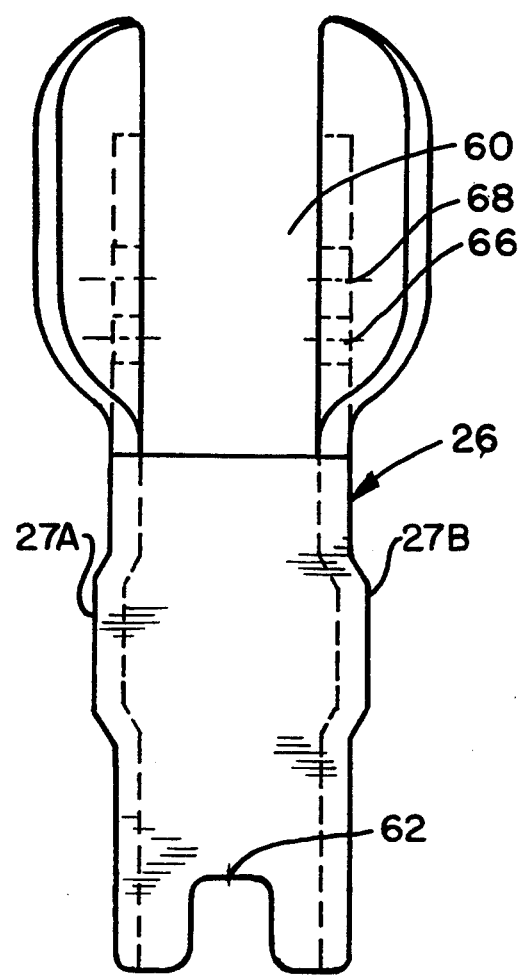
FIG. 4 is a front view of the closure frame shown in FIG. 3.

FIGS. 3-7 show details of the preferred components for implementing the invention as shown generally in FIGS. 1 and 2. FIGS. 3 and 4 show the closure frame 26, which has two side walls 27A, 27B that straddle the shank 18 when assembled as shown in FIG. 1, and a front wall 62 which is adapted to mate at the latching corner, with the nose of the hook. Preferably, the portion of the frame at the actuating corner is flaired 64 to define the opening 60 through which the actuating thumb piece (FIGS. 6 and 7) is accessible. Preferably, the portion of the closure frame shown in FIGS. 3 and 4, is a unitary piece of steel, that has been bent. Two through bores 66,68 are provided between the walls, one of which 66 will form part of the pivot connection 20 to the first protrusion 22 shown in FIGS. 1 and 2, and the other of which 68 will attach the locking means within the locking corner 30 of the frame.

FIG. 5 shows the preferred structure of the locking means, wherein a solid plug 70 or the like is welded within a substantially "C" shaped bracket 72. The plug includes a through bore 74 which mates with the bore 68 of the frame as shown in FIG. 3. The plug also includes another bore 44 which aligns with the locking recess 40 on the backside of the shank, as shown in FIG. 1. After the spring 46 and locking pin 42 are inserted into the bore 44 or similar socket-forming structure, the sub-assembly shown in FIG. 5 is connected to the locking corner 30 of the frame by a rivet 76 or the like through bores 68,74. The bracket 72 has a convenient shape which is comfortable to pull as a trigger with the forefinger F from the position of FIG. 1 to the position of FIG. 2.

FIGS. 1,6 and 7 show that the preferred form of the actuating thumb piece 56 is a unitary member which, in overall appearance, is also triangular and which has two sides 78A,78B for cradling the shank, and a front surface 58 against which the user's thumb is pressed. The thumb piece may be considered as having a first end 58 accessible to the thumb, and a web portion 80 defined by the two sides, which extends in parallel with the respective side walls of the frame 26, such that a plunger carried at the other end 82 of the piece, can urge the locking pin out of the recess shown in FIG. 1. Preferably, the thumb piece 56 has opposed through bores 84 through the sides, and a pin 38 or the like which is in the recess 40 and connected between the side walls of the thumb piece, for sliding movement within the recess. The web portion 80 of the thumb piece preferably includes a slot 86 that is elongated in the direction from the pivot point 20 on the shank, toward the recess 40 on the back side of the shank. The pivot pin 20 which connects the closure frame 26 to the shank also passes through the slots 86 on the thumb piece. In this manner, the thumb piece 56 can be displaced linearly along the line from the pivot connection 20 to the recess 40, independently of the rotational movement of the frame 26 about the pivot point 20.

It should be appreciated that the invention has been described with respect to implementation in a snap hook, but the invention may also be usable in other contexts, such as ladder or pipe hangers, or other restraining devices. Generally, the curvature on the second end 16 and/or shank 18 of the body in such other contents would define a larger or differently shaped opening than is depicted by FIG. 1.

I claim:

1. A double action closure mechanism operable with the thumb and forefinger of one hand, comprising:
   a rigid body having a first end, a second end forming a curved nose, and a shank extending between the ends, the shank defining a front side facing the nose and a back side facing away from the nose, the back side of the shank including a recess;
   a closure frame pivotally connected to the front side of the shank and defining a locking corner at the back side of the shank, a latching corner adjacent the nose of the rigid body, and an actuating corner at the front side of the shank adjacent the pivotal connection, the latching corner including a latching surface adapted to closed against the nose when the frame is pivoted about the shank into a closed position and to move away from the nose toward the shank when the frame is pivoted about the shank into an open position;
   means between the front side of the shank and the frame, for biasing the frame into the closed position;
   locking means supported within the locking corner of the frame and engagable with the back side of the shank when the frame is in the closed position, to prevent the frame from pivoting out of the closed position, the locking means including a locking pin slidable into and out of the recess, socket means within the locking corner of the frame for slidingly supporting the locking pin, and means for biasing the locking pin into a locked position partly in the socket and partly in the shank recess;
   actuating means accessible at the actuating corner and supported within the frame for movement toward the locking corner, said movement being effective to disengage the locking means from the back side of the shank, independent of the pivotable movement of the frame relative to the shank;
   whereby the frame can be pivoted about the shank from the closed to the open position, by first urging the actuating means toward the locking corner with the thumb to disengage the locking means from the shank, and then pulling the locking means from the shank, and then pulling the locking corner toward the shank first end with the forefinger to pivot the frame.

2. The closure mechanism of claim 1, wherein the actuating means includes
   a plunger located in the recess on the back side of the shank for slidable movement toward the locking pin, and
   a thumb piece having a first end accessible to the thumb at the actuating corner of the frame, a web portion extending toward the plunger within the frame, and means connecting the web to the plunger,
   whereby the locking pin can be displaced entirely out of the recess by pushing on the thumb piece to slide the plunger against the locking pin.

3. A double action snap hook operable with the thumb and forefinger of one hand, comprising;
   a body having a first end adapted for attachment to a line, a second end forming a curved nose, and a shank extending between the ends, the shank defining a front side facing the nose and a back side facing away from the nose, the back side of the shank including a recess;
   a closure frame including two generally triangular walls between which the shank traverses and is pivotally connected to the frame, the walls defining three corners of the frame including a locking corner at the back side of the shank and a latching corner and an actuating corner at the front side of the shank, the latching corner including a latching surface adapted to close against the nose when the frame is pivoted about the shank into a closed position and to move away from the nose toward the shank when the frame is pivoted about the shank into an open position;
   means between the front side of the shank and the closure frame, for biasing the closure frame into the closed position;
   locking means supported within the locking corner of the frame and engageable with the back side of the shank when the frame is in the closed position, to prevent the frame from pivoting out of the closed position, the locking means including a locking pin slidable into and out of the recess, socket means within the locking corner of the frame for slidingly supporting the locking pin, and means for biasing the locking pin into a locked position partly in the socket and partly in the shank recess;
   actuating means accessible at the actuating corner and supported within the frame for movement toward the locking corner, said movement being effective to disengage the locking means from the back side of the shank, independent of the pivotable movement of the frame relative to the shank;
   whereby the frame can be pivoted about the shank from the closed to the open position, by first urging the actuating means towards the locking corner with the thumb to disengage the locking means from the shank, and then pulling the locking corner toward the shank first end with the forefinger to pivot the frame.

4. The snap hook of claim 3, wherein the actuating means includes
   a plunger located in the recess on the back side of the shank for slidable movement toward the locking pin, and
   a thumb piece having a first end accessible to the thumb at the actuating corner of the frame, a web portion extending toward the plunger within the frame, and means connecting the web to the plunger,
   whereby the locking pin can be displaced entirely out of the recess by pushing on the thumb piece to slide the plunger against the locking pin.

5. The snap hook of claim 4, wherein the pivot connection between the frame and shank is located at the front side of the shank, between the locking corner and the actuating corner.

6. The snap hook of claim 4, wherein
   the web has two sides which extend in parallel with respective walls of the frame, and
   the plunger is a bar situated transversely through the recess.

7. The snap hook of claim 4, wherein the web of the thumb piece includes a slot which passes through the pivot connection of the frame to the shank, and is elongated in the direction of thumb piece movement.

8. The snap hook of claim 3, wherein the pivot connection between the frame and shank is located at the front side of the shank, between the locking corner and the actuating corner.

9. The snap hook of claim 8, wherein the front side of the shank has a first protrusion, and the pivot is in said first protrusion.

10. The snap hook of claim 9, wherein the front side of the shank has a second protrusion between the nose and the first protrusion, and a spring is supported between the second protrusion and the frame intermediate the actuating and latching corners, as the means for biasing the frame into the closed position.

* * * * *

UNITED STATES PATENT AND TRADEMARK OFFICE
CERTIFICATE OF CORRECTION

PATENT NO. : 5,361,464
DATED : November 8, 1994
INVENTOR(S) : Edward Bunnell

It is certified that error appears in the above-indentified patent and that said Letters Patent is hereby corrected as shown below:

Column 5, line 19, change "closed" to --close--.

Signed and Sealed this

Third Day of December, 1996

Attest:

BRUCE LEHMAN

Attesting Officer

Commissioner of Patents and Trademarks